UNITED STATES PATENT OFFICE.

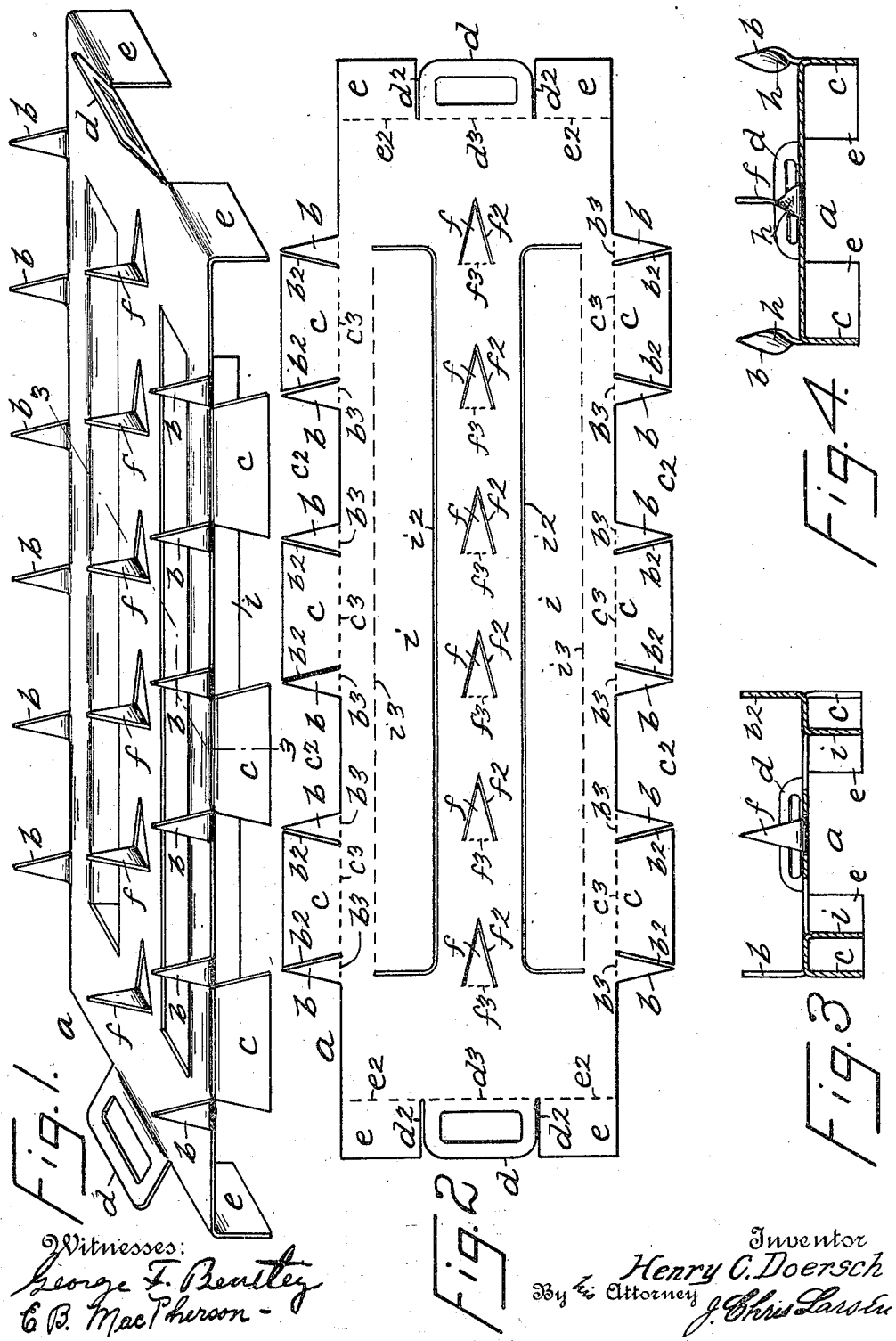

HENRY C. DOERSCH, OF NYACK, NEW YORK.

POTATO-BAKING UTENSIL.

997,653.

Specification of Letters Patent. Patented July 11, 1911.

Application filed July 29, 1910. Serial No. 574,444.

*To all whom it may concern:*

Be it known that I, HENRY C. DOERSCH, a citizen of the United States of America, and residing at Nyack, in the county of Rockland and State of New York, have invented certain new and useful Improvements in Potato-Baking Utensils, of which the following is a specification, such as will enable those skilled in the art to which it appertains to make and use the same.

This invention relates to cooking utensils, and the object thereof is to provide simple and efficient means for baking potatoes, apples, and the like; a further object is to provide such devices whereby the article being baked is subjected to the same degree of heat on all portions of the surface thereof as well as insuring the dryness of the heat striking the said article; a further object is to provide such a device whereby a large number of the said articles may be simultaneously baked and all in like degree; a further object is to form the said device of a single blank of metal or the like; a further object is to provide supporting means for the said device whereby it is elevated above an oven floor and thus permit free passage for heated air thereunder; a further object is to provide handles for the said device also formed from the said blank; a further object is to provide holding means for the said articles being baked and which require a partial rotation of said articles in order to prevent accidental dislodgment thereof; and a still further object is to provide such a device which is very inexpensive, well adapted for the purpose for which it is intended, and not liable to get out of order and require repair.

My invention is fully set forth in the following specification, of which the accompanying drawings form a part, in which the separate parts are designated by the same reference characters in each of the views, and in which:—

Figure 1 is a perspective view of one form of embodiment of my invention; Fig. 2 is a plan view of the blank from which it is formed; Fig. 3 is a section on the line 3—3 of Fig. 1; and Fig. 4 is a transverse section showing a modification over the preceding figures.

In the drawings forming a part of this application I have shown a device for the purpose stated comprising a blank bent into desired form after being cut to a desired shape, said shape consisting of a body portion $a$ preferably of greater dimension in one direction than in the other and having a plurality of pointed tongues formed upon and at right angles to the longer sides, as shown at $b$, said tongues being produced by cuts $b^2$ and thus leaving members $c$ therebetween, although in practice I may dispense with a portion of said members as shown and thus leaving spaces $c^2$ between the tongues, preferably alternately, and the said tongues are adapted to be bent upwardly into vertical position on lines $b^3$ whereas the said members are adapted to be bent downwardly into vertical position on lines $c^3$, thus forming legs or supports for the body member $a$.

The shorter sides have handles $d$ formed centrally thereof by means of cuts $d^2$ thus leaving end projections $e$ on either side thereof adapted to be bent downwardly as shown on lines $e^2$ into vertical position whereas the handles are adapted to be bent into upwardly inclined positions on lines $d^3$ and it will be observed that the height of the said projections and members, when so bent, is the same, and all serve as supports for the device.

Intermediate of the tongues $b$, and preferably arranged in one or more lines, are a plurality of similar tongues $f$ produced by inclined cuts $f^2$ and adapted to be bent upwardly into vertical position on lines $f^3$, all of the said tongues $b$ and $f$ forming spits upon which the articles to be baked are impaled, these tongues being normally left in the form shown in Figs. 1 to 3 inclusive, but I may twist them spirally as shown at $h$ in Fig. 4 whereby a partial rotation of the article impaled thereon is necessary, thus preventing accidental dislodgment thereof if the device is inclined too far or turned over. If found desirable I may also form strengthening ribs $i$ formed by means of cuts $i^2$ and adapted to be bent downwardly on lines $i^3$ thus serving also as supports for the device as well as for preventing the sagging thereof when filled with articles being baked.

It will thus be seen that I provide a device of this character which requires but two operations in the manufacture thereof, the cutting into desired shape with one set of dies, and the bending of the several elements as described by another set of dies and my invention is therefore very inexpensive to produce and, while I have shown supports at the sides, ends, and intermediate thereof, for the body portion of my device it will be understood that I do not limit myself to the combined use thereof, as it may be found necessary only to employ either set of said supports, or any two in combination in order to meet the requirements of various sizes of the device, my invention being based upon such a device formed of a single sheet of material and provided with a plurality of impaling tongues maintained well above the oven floor, and having the handles formed thereon.

Having fully described my invention, what I claim as new and desire to secure by Letters Patent, is:—

1. A potato baking utensil, constructed from a blank of sheet metal, having inwardly diverging incisions at a plurality of points in the sides thereof to form upwardly bent pointed tongues, the metal between said tongues being downwardly bent to form supports for said blank, said blank having end incisions, the metal therebetween being turned upwardly to form handles, and the metal on either side of said handles being turned downwardly to form supplemental supports for said blank, said supports being also formed by said incisions.

2. A potato baking utensil, constructed from a blank of sheet metal, having inwardly diverging incisions at a plurality of points in the sides thereof to form upwardly bent pointed tongues, the metal between said tongues being downwardly bent to form supports for said blank, said blank having end incisions, the metal therebetween being turned upwardly to form handles, and the metal on either side of said handles being turned downwardly to form supplemental supports for said blank, said supports being also formed by said incisions, said sheet being also provided with U-shaped incisions, the free metal formed thereby being turned downwardly to form strengthening ribs for said blank.

In testimony that I claim the foregoing as my invention I have signed my name in presence of the subscribing witnesses this 28th day of July 1910.

HENRY C. DOERSCH.

Witnesses:
GEORGE F. BENTLEY,
E. B. MACPHERSON.